United States Patent
Cunningham

(10) Patent No.: US 9,767,848 B2
(45) Date of Patent: *Sep. 19, 2017

(54) SYSTEMS AND METHODS FOR COMBINING DRAWINGS AND VIDEOS PRIOR TO BUFFER STORAGE

(71) Applicant: Facebook, Inc., Menlo Park, CA (US)

(72) Inventor: Christopher Cunningham, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,808

(22) Filed: Jan. 6, 2017

(65) Prior Publication Data

US 2017/0117018 A1  Apr. 27, 2017

Related U.S. Application Data

(63) Continuation of application No. 14/577,266, filed on Dec. 19, 2014.

(51) Int. Cl.

| | |
|---|---|
| H04N 5/77 | (2006.01) |
| G11B 27/036 | (2006.01) |
| H04N 5/232 | (2006.01) |
| H04N 5/272 | (2006.01) |
| H04N 9/82 | (2006.01) |
| H04N 9/87 | (2006.01) |

(52) U.S. Cl.
CPC ....... *G11B 27/036* (2013.01); *H04N 5/23216* (2013.01); *H04N 5/23293* (2013.01); *H04N 5/272* (2013.01); *H04N 5/77* (2013.01); *H04N 9/8227* (2013.01); *H04N 9/8715* (2013.01)

(58) Field of Classification Search
None
See application file for complete search history.

(56) References Cited

U.S. PATENT DOCUMENTS

| | | |
|---|---|---|
| 2006/0244812 A1 | 11/2006 | Jeong et al. |
| 2012/0113228 A1* | 5/2012 | Konno ............... H04N 13/0239 348/47 |
| 2013/0002602 A1* | 1/2013 | Apelbaum ........ H04M 1/72547 345/174 |
| 2013/0176442 A1* | 7/2013 | Shuster .................... G06K 9/62 348/207.1 |
| 2014/0300722 A1 | 10/2014 | Garcia |
| 2015/0346863 A1* | 12/2015 | Morita .................. G06F 3/0416 345/174 |
| 2016/0091964 A1* | 3/2016 | Iyer ...................... G02B 27/017 345/633 |

* cited by examiner

*Primary Examiner* — Eileen Adams
(74) *Attorney, Agent, or Firm* — Sheppard Mullin Richter & Hampton LLP

(57) ABSTRACT

Systems, methods, and non-transitory computer-readable media can initiate a video capture mode that provides a camera view. A touch gesture can be detected via a touch display. A drawing can be rendered based on the touch gesture. The drawing can be rendered to appear to overlay the camera view. A first video image frame can be acquired based on the camera view. At least a portion of the first video image frame and the drawing can be combined to produce a first combined frame. The drawing can appear to overlay the first video image frame. The first combined frame can be stored in a video buffer.

20 Claims, 10 Drawing Sheets

650

Acquire, from the video buffer, the first combined frame and the second combined frame
652

Generate a video content item based on at least the first combined frame and the second combined frame
654

SYSTEMS AND METHODS FOR COMBINING DRAWINGS AND VIDEOS PRIOR TO BUFFER STORAGE

CROSS-REFERENCE TO RELATED APPLICATIONS

This application is a continuation of U.S. patent application Ser. No. 14/577,266, filed on Dec. 19, 2014 and entitled "SYSTEMS AND METHODS FOR COMBINING DRAWINGS AND VIDEOS PRIOR TO BUFFER STORAGE", which is incorporated herein by reference.

FIELD OF THE INVENTION

The present technology relates to the field of media processing. More particularly, the present technology relates to techniques for combining drawings and videos prior to buffer storage.

BACKGROUND

Today, people often utilize computing devices (or systems) for a wide variety of purposes. Users can use their computing devices to, for example, interact with one another, create content, share information, and access information. In some instances, a user can utilize his or her computing device to generate media content, such as images or videos. For example, under conventional approaches, a user of a computing device can capture or record a video content item (i.e., a video). In some cases, the user can store and share the video content item.

Moreover, under conventional approaches, the user can graphically edit or modify the video content item after the video content item has been captured or recorded. However, conventional approaches to generating and editing media content can be uninteresting, boring, or not sufficiently interactive. These and other similar concerns can reduce or create challenges for the overall user experience associated with using computing devices to produce with media content.

SUMMARY

Various embodiments of the present disclosure can include systems, methods, and non-transitory computer readable media configured to initiate a video capture mode that provides a camera view. A touch gesture can be detected via a touch display. A drawing can be rendered based on the touch gesture. The drawing can be rendered to appear to overlay the camera view. A first video image frame can be acquired based on the camera view. At least a portion of the first video image frame and the drawing can be combined to produce a first combined frame. The drawing can appear to overlay the first video image frame. The first combined frame can be stored in a video buffer.

In an embodiment, a second video image frame can be acquired based on the camera view. The second video image frame can be sequentially subsequent to the first video image frame. At least a portion of the second video image frame and the drawing can be combined to produce a second combined frame. The drawing can appear to overlay the second video image frame. The second combined frame can be stored in the video buffer.

In an embodiment, the first combined frame and the second combined frame can be acquired from the video buffer. A video content item can be generated based on at least the first combined frame and the second combined frame. The video content item can present the second combined frame sequentially subsequent to presenting the first combined frame.

In an embodiment, the touch gesture can include a first touch gesture portion and a second touch gesture portion. The first touch gesture portion can be detected within an allowable time deviation from the acquiring of the first video image frame. The second touch gesture portion can be detected within an allowable time deviation from the acquiring of the second video image frame.

In an embodiment, the first touch gesture portion and the second touch gesture portion can continuously form at least part of the touch gesture.

In an embodiment, the rendering of the drawing based on the touch gesture can further comprise determining one or more positions relative to the touch display at which the touch gesture is detected. The drawing can be generated at the one or more positions.

In an embodiment, the combining of at least the portion of the first video image frame and the drawing to produce the first combined frame can further comprise replacing a first set of pixels of the first video image frame at the one or more positions with a collection of pixels representing the drawing. A second set of pixels of the first video image frame outside the one or more positions can be composited with the collection of pixels representing the drawing to produce the first combined frame.

In an embodiment, one or more selections for one or more drawing options can be received prior to the detecting of the touch gesture via the touch display. The drawing can be based on the one or more selections.

In an embodiment, the one or more drawing options can include at least one of a drawing color, a drawing tool type, or a drawing tool size.

In an embodiment, the camera view can correspond to a live camera view presented in real-time.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
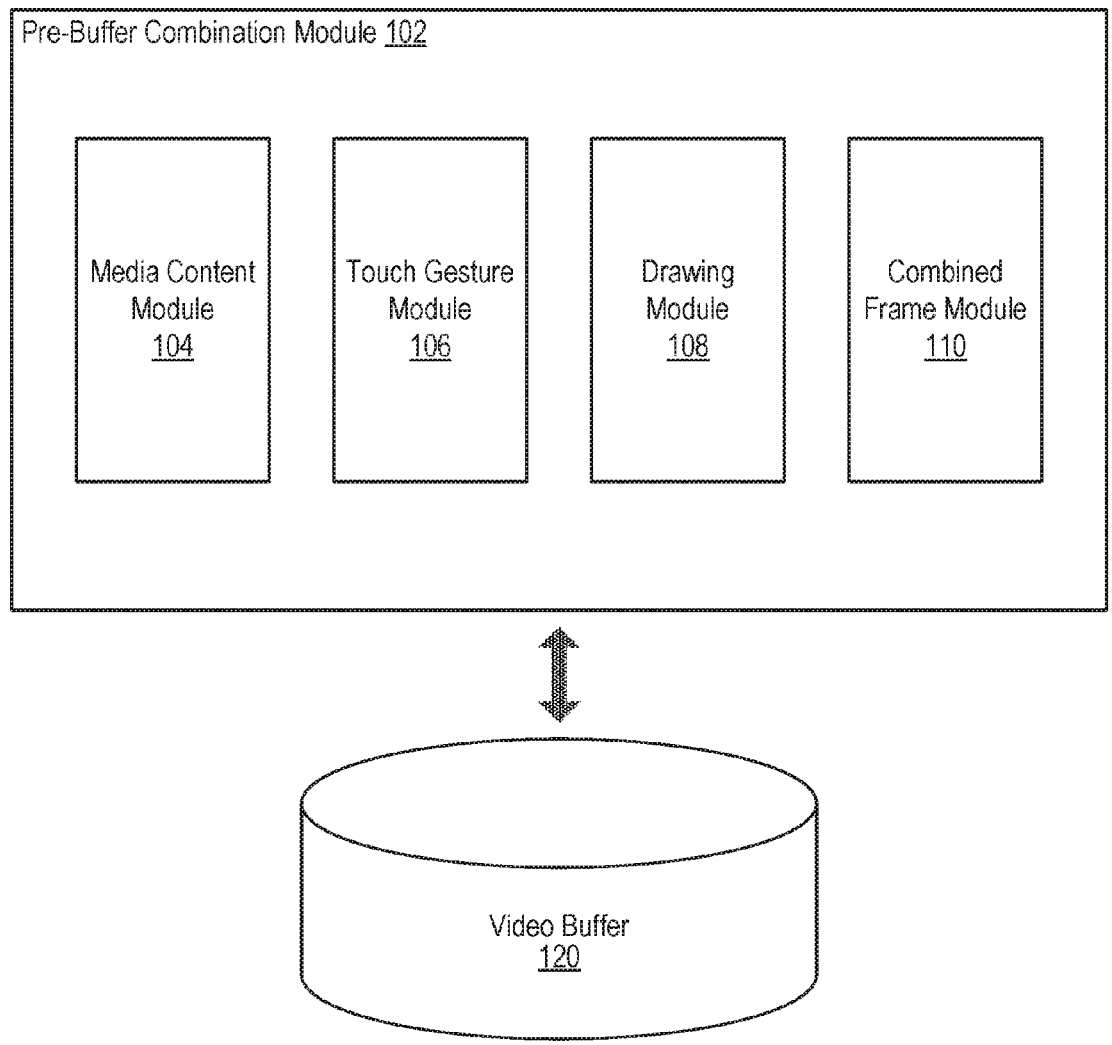
FIG. 1 illustrates an example system including an example pre-buffer combination module configured to facilitate combining drawings and videos prior to buffer storage, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Combining Drawings and Videos Prior to Buffer Storage

People use computing devices (or systems) for a wide variety of purposes. Computing devices can provide different kinds of functionality. Users can utilize their computing devices to produce information, access information, and share information. In some cases, people can utilize their computing devices to create media content, such as images or videos. For example, a user of a computing device can utilize a camera corresponding to or included in the computing device to capture or record a video content item (i.e., a video).

Moreover, under conventional approaches, the user can edit or modify media content, such as the video, subsequent to the media content being captured or recorded. In one example, the user can capture or record the video, and then draw on the video. However, conventional approaches to capturing or recording the video can be uninteresting, boring, and not sufficiently interactive. Furthermore, under conventional approaches, the video and the drawing subsequently made by the user can be stored separately. However, in accordance conventional approaches, when the video and the separately stored drawing are to be played back, additional processing may be required to render the video together with the drawing, Accordingly, these and other similar types of conventional approaches to producing media content can be boring, uninteresting, not sufficiently interactive, and/or inefficient.

Therefore, an improved approach can be beneficial for addressing or alleviating various concerns associated with conventional approaches. The disclosed technology can offer a more interesting, interactive, and efficient approach by combining drawings and videos prior to buffer storage. Various embodiments of the present disclosure can initiate a video capture mode that provides a camera view. A touch gesture can be detected via a touch display. A drawing can be rendered based on the touch gesture. The drawing can be rendered to appear to overlay the camera view. A first video image frame can be acquired based on the camera view. At least a portion of the first video image frame and the drawing can be combined to produce a first combined frame. The drawing can appear to overlay the first video image frame. The first combined frame can be stored in a video buffer. It is contemplated that there can be many variations and/or other possibilities.

FIG. 1 illustrates an example system 100 including an example pre-buffer combination module 102 configured to facilitate combining drawings and videos prior to buffer storage, according to an embodiment of the present disclosure. As shown in the example of FIG. 1, the pre-buffer combination module 102 can include a media content module 104, a touch gesture module 106, a drawing module 108, and a combined frame module 110. In some instances, the example system 100 can also include a video buffer 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the pre-buffer combination module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the pre-buffer combination module 102 can be implemented, in part or in whole, as software running on one or more computing devices or systems, such as on a user or client computing device. For example, the pre-buffer combination module 102 or at least a portion thereof can be implemented as or within an application (e.g., app), a program, or an applet, etc., running on a user computing device or a client computing system, such as the user device 710 of FIG. 7. In another example, the pre-buffer combination module 102 or at least a portion thereof can be implemented using one or more computing devices or systems that include one or more servers, such as network servers or cloud servers. In some instances, the pre-buffer combination module 102 can, in part or in whole, be implemented within or configured to operate in conjunction with a social networking system (or service), such as the social networking system 730 of FIG. 7. It should be understood that there can be many variations or other possibilities.

In some embodiments, the media content module 104 can be configured to facilitate initiating a video capture mode that provides a camera view. For example, the media content module 104 can provide an option to enable a mode for capturing or recording video content using a camera of a computing device (or system). When the video capture mode is activated or enabled, a camera view can be presented on a display element, such as a touch display, of the computing device. The camera view can show whatever the camera (and/or the lens of the camera) is "seeing" from the perspective or viewpoint of the camera. In some cases, the camera view can correspond to a live camera view presented in (or near) real-time, such that the live camera view can be updated in (or near) real-time in accordance with one or more movements incurred by the camera.

The touch gesture module 106 can be configured to facilitate detecting a touch gesture via a touch display, which can perform touch sensing. In some implementations, the touch gesture module 106 can correspond to, include, and/or operate with the touch display in order to detect, identify, or otherwise process touch gestures. In one example, the camera view can be presented on the touch display and a fingertip touch gesture performed by a user of the computing device can be detected by the touch display. Examples of the touch gesture can include, but are not limited to. fingertip strokes, fingertip swipes, stylus strokes, stylus swipes, and/ or other touch (or near-touch) movements.

In one example, the touch gesture can be performed while video content is being captured or recorded. In this example, the touch gesture can include, but is not limited to, a first touch gesture portion and a second touch gesture portion. In this example, the first touch gesture portion and the second touch gesture portion can continuously form at least part of the touch gesture. The first touch gesture portion can be detected within an allowable time deviation from the acquiring of the first video image frame, such as at substantially the same time as when the first video image frame is captured or recorded. The second touch gesture portion can be detected within an allowable time deviation from the acquiring of a second video image frame. This can be repeated with a third touch gesture portion and a third video image frame, and so forth. Accordingly, in some cases, the touch gesture or at least one portion thereof can be detected when video image frames are being acquired.

Moreover, the drawing module 108 can be configured to facilitate rendering a drawing based on the touch gesture. The drawing module 108 can facilitate rendering the drawing such that the drawing appears to overlay the camera view. The drawing module 108 will be discussed in more detail below with reference to FIG. 2A.

The media content module 104 can further be configured to facilitate acquiring a first video image frame based on the camera view. In some instances, while the video capture mode has been initiated or activated, the media content module 104 can receive an instruction, such as a user command, to capture, record, or otherwise acquire a still frame based on whatever is shown in the camera view. The still frame can correspond to the first video image frame, which can be part of a plurality of video image frames used to form or generate a video content item (i.e., a video, a video file, etc.).

In addition, the combined frame module 110 can be configured to facilitate combining at least a portion of the first video image frame and the drawing to produce a first combined frame. In the first combined frame, the drawing can, for example, appear to overlay the first video image frame. More details associated with the combined frame module 110 will be provided below with reference to FIG. 2B.

The pre-buffer combination module 102 can also facilitate storing the first combined frame in the video buffer 120. The pre-buffer combination module 102 can communicate with, transmit information to, and receive information from the video buffer 120, as shown in the example system 100. The video buffer 120 can be configure to store, at least temporarily, one or more video image frames. In some implementations, the one or more video image frames can be retrieved or acquired from the video buffer 120 and combined in an appropriate sequence to produce a video content item.

In some instances, a second video image frame can be acquired, such as by the media content module 104, based on the camera view. The second video image frame can be sequentially subsequent to the first video image frame. At least a portion of the second video image frame and the drawing can be combined, such as by the combined framed module 110, to produce a second combined frame. In the second combined frame, the drawing can appear to overlay the second video image frame. The pre-buffer combination module 102 can facilitate storing the second combined frame in the video buffer.

Furthermore, in some implementations, the pre-buffer combination module 102 can facilitate acquiring, from the video buffer, the first combined frame and the second combined frame. The pre-buffer combination module 102 can also facilitate generating a video content item based on at least the first combined frame and the second combined frame. The generated video content item can present the second combined frame sequentially subsequent to presenting the first combined frame. It should be appreciated that many variations are possible.

Figure 2A:
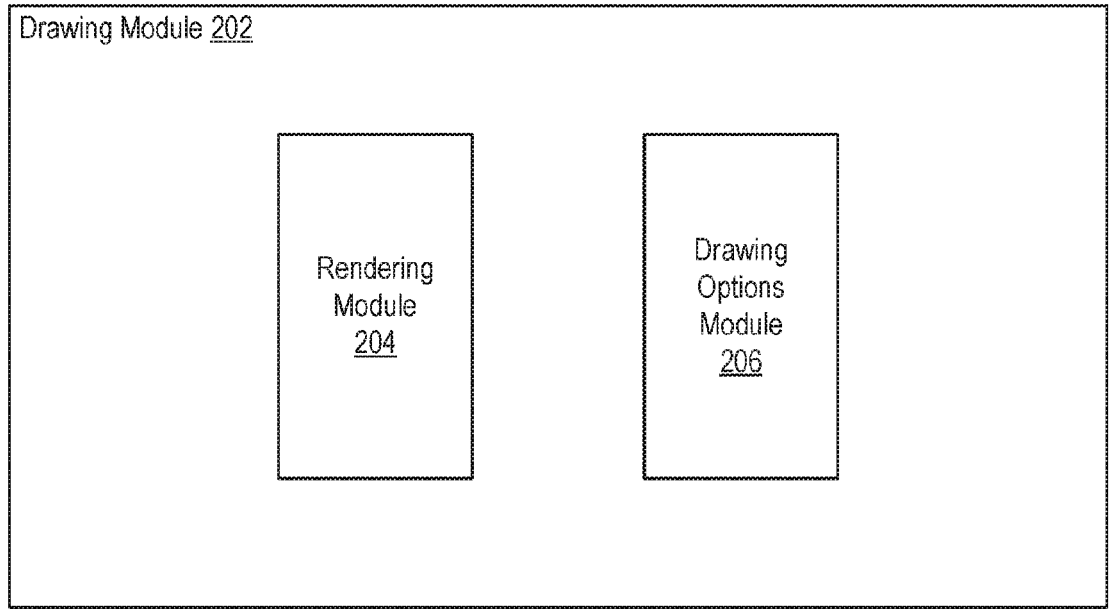
FIG. 2A illustrates an example drawing module configured to facilitate combining drawings and videos prior to buffer storage, according to an embodiment of the present disclosure.

FIG. 2A illustrates an example drawing module 202 configured to facilitate combining drawings and videos prior to buffer storage, according to an embodiment of the present disclosure. In some embodiments, the drawing module 108 of FIG. 1 can be implemented as the example drawing module 202. As shown in FIG. 2A, the example drawing module 202 can include a rendering module 204 and a drawing options module 206.

The drawing module 202 can utilize the rendering module 204 to render, present, or display, etc., a drawing based on a touch gesture, which is detected via a touch display. The rendering module 204 can render the drawing such that the drawing appears to overlay the camera view. In some implementations, the rendering of the drawing based on the touch gesture can further comprise determining one or more positions relative to the touch display at which the touch gesture is detected and generating the drawing at the one or more positions.

In one example, the rendering module 204 can determine, calculate, identify, or acquire one or more touch display positions at which a user's fingertip touch gesture was performed. The rendering module 204 can generate the drawing at the one or more touch display positions (and in accordance with a sequence of how the user's fingertip moves from one touch display position to another). Accordingly, the touch gesture can cause the drawing to be rendered based on how and when the touch gesture moves. It should be understood that many variations are possible.

Moreover, the drawing options module 206 can be configured to provide one or more drawing options. In some instances, the one or more drawing options can include, but are not limited to, at least one of a drawing color, a drawing tool type, or a drawing tool size. The drawing options module 206 can also be configured to facilitate receiving one or more selections for the one or more drawing options prior to the detecting of the touch gesture via the touch display. The drawing can be based on the one or more selections. For example, if the drawing color is selected to be blue, if the drawing tool type is selected to be a virtual brush, and if the drawing tool size is selected to correspond to a diameter of ten pixels, then the drawing can be rendered as being blue in color, as being drawn by the virtual brush, and as having a stroke thickness of ten pixels. Again, many variations are possible.

Figure 2B:
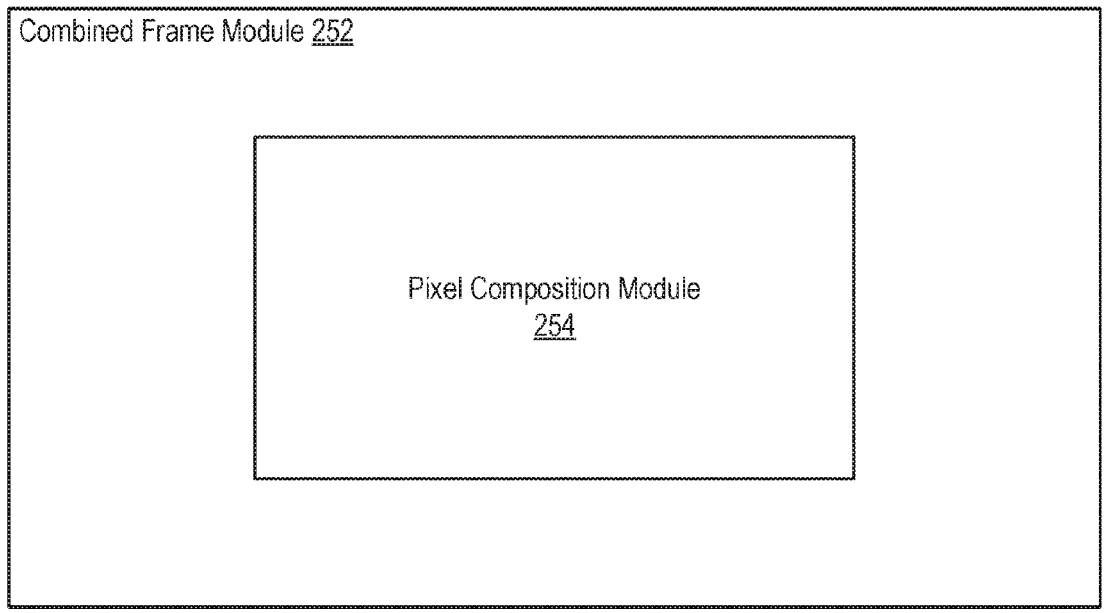
FIG. 2B illustrates an example combined frame module configured to facilitate combining drawings and videos prior to buffer storage, according to an embodiment of the present disclosure.

FIG. 2B illustrates an example combined frame module 252 configured to facilitate combining drawings and videos prior to buffer storage, according to an embodiment of the present disclosure. In some embodiments, the combined frame module 110 of FIG. 1 can be implemented as the example combined frame module 202. As shown in FIG. 2B, the example combined frame module 252 can include a pixel composition module 254.

The combined frame module 252 can facilitate combining at least a portion of a first video image frame and a drawing to produce a first combined frame, as discussed previously. The drawing can appear to overlay the first video image frame. In some embodiments, the pixel composition module 254 can facilitate the combining of at least the portion of the first video image frame and the drawing to produce the first combined frame.

As discussed above, the drawing can be rendered based on determining one or more positions relative to a touch display at which a touch gesture is detected and generating the drawing at the one or more positions. The pixel composition module 254 can be configured to replace a first set of pixels of the first video image frame at the one or more positions with a collection of pixels representing the drawing. In one example, the collection of pixels representing the drawing can be produced during the rendering of the drawing. In this example, the collection of pixels representing the drawing can be presented on the touch display at the one or more positions instead of the pixels (e.g., the first set of pixels) in the first video image frame that were otherwise supposed to be presented at the one or more positions.

Further, the pixel composition module 254 can be configured to composite or combine a second set of pixels of the first video image frame outside the one or more positions with the collection of pixels representing the drawing in order to produce the first combined frame. The second set of pixels of the first video image frame can correspond to those pixels in the first video image frame that are not included in the first set of pixels. As such, continuing with the previous example, the first combined frame can include, at the one or more positions, the collection of pixels representing the drawing and can elsewhere include the second set of pixels of the first video image frame.

It is contemplated that there can be many variations and other possibilities. For example, the pixel composition module 254 can facilitate combining at least a portion of a second video image frame and the drawing to produce a second combined frame. This can be repeated for a third video image frame and a third combined frame, and so forth. It is understood that any suitable number of frames can be utilized.

Figure 3:
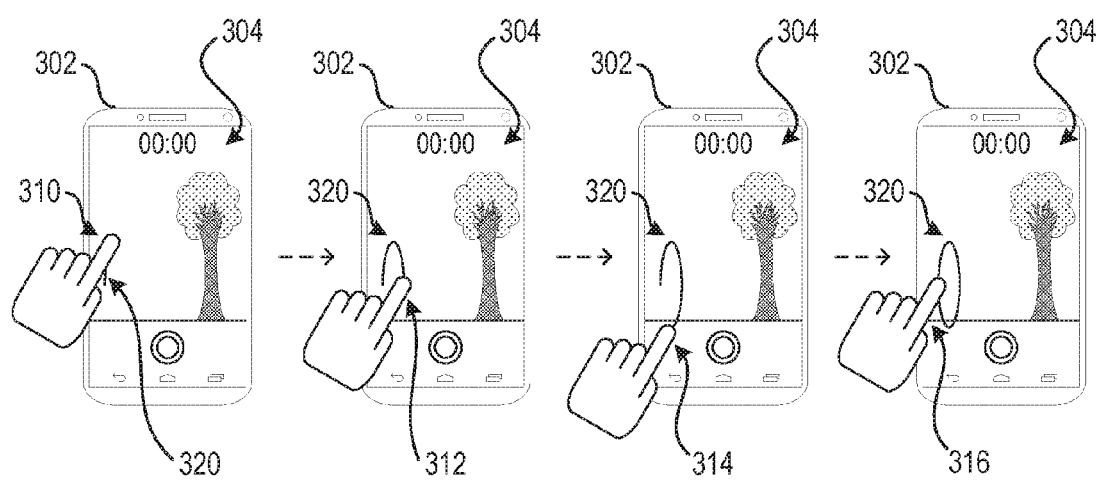
FIG. 3 illustrates an example scenario associated with combining drawings and videos prior to buffer storage, according to an embodiment of the present disclosure.

FIG. 3 illustrates an example scenario 300 associated with combining drawings and videos prior to buffer storage, according to an embodiment of the present disclosure. The example scenario 300 illustrates a computing device (or system) 302 that utilizes the pre-buffer combination module 102 of FIG. 1.

In the example scenario 300, a video capture mode that provides a camera view 304 has been initiated at the computing device 302. Although the video capture mode has been initiated or activated, video content is not yet being captured or recorded. A touch gesture can be detected via a touch display of the computing device 302. In this example, the touch gesture can include at least a first touch gesture portion 310, a second touch gesture portion 312, a third touch gesture portion 314, and a fourth touch gesture portion 316, and so forth.

Moreover, in this example scenario 300, a drawing 320 can be rendered based on the touch gesture (e.g., touch gesture portions 310 through 316). As shown in the example scenario 300, the drawing 320 can be rendered to appear to overlay the camera view 304.

Figure 4:
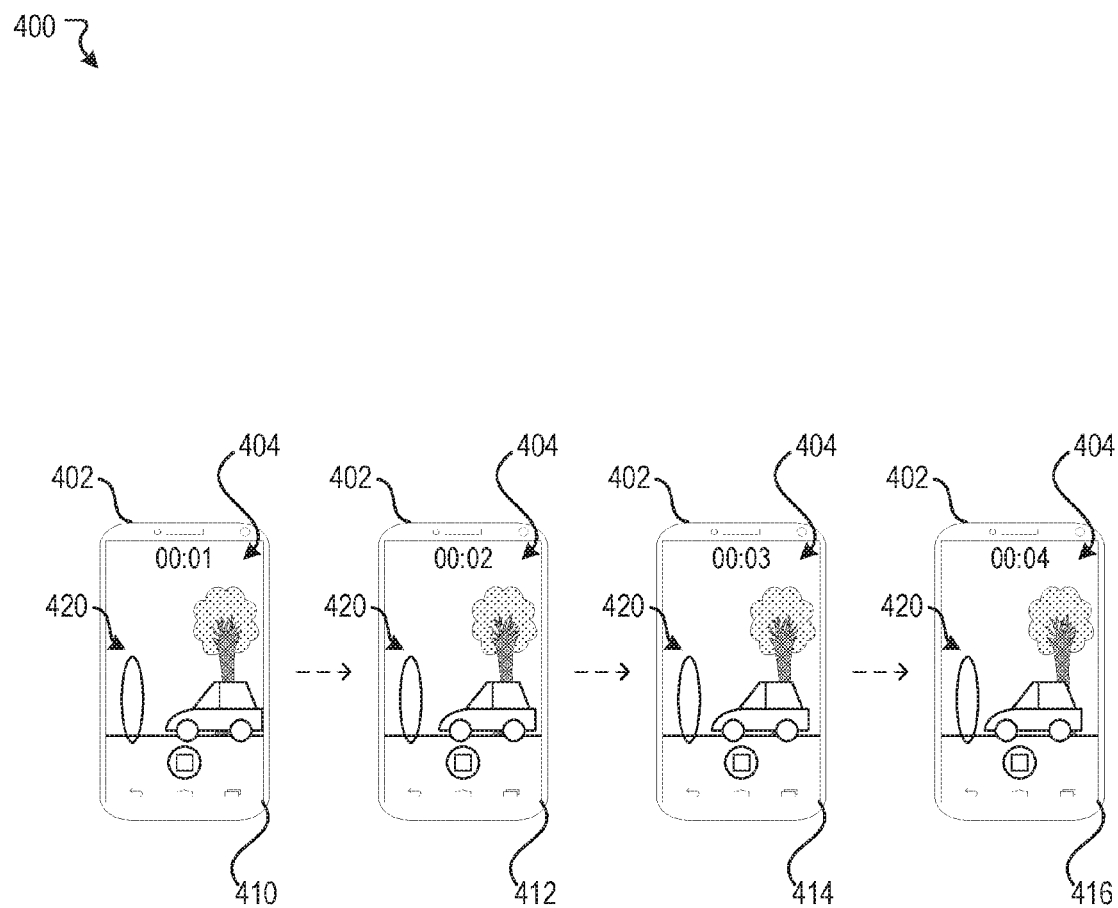
FIG. 4 illustrates an example scenario associated with combining drawings and videos prior to buffer storage, according to an embodiment of the present disclosure.

FIG. 4 illustrates an example scenario 400 associated with combining drawings and videos prior to buffer storage, according to an embodiment of the present disclosure. The example scenario 400 illustrates a computing device 402, such as the computing device 302 of FIG. 3.

As shown, a drawing 420 can be rendered to appear to overlay a camera view 404. In the example scenario 400, video capturing or recording has been initiated at the computing device 402. In this example, the computing device 402 can acquire a first video image frame 410 based on the camera view 404. Moreover, the computing device 402 can combine at least a portion of the first video image frame 410 and the drawing 420 to produce a first combined frame, such that the drawing 420 appears to overlay the first video image frame 410. The computing device 402 can further store the first combined frame in a video buffer.

Similarly, based on the camera view 404, the computing device 402 can acquire a second video image frame 412, a third video image frame 414, a fourth video image frame 416, and so forth. As shown in this example scenario 400, the frames are acquired by the computing device 402 at a rate of one frame per second (FPS). The computing device 402 can also produce and store in the video buffer a second combined frame, a third combined frame, and a fourth combined frame, and so forth. Furthermore, a video can be generated based on at least the first, second, third, and fourth combined frames. Many variations are possible.

Figure 5:
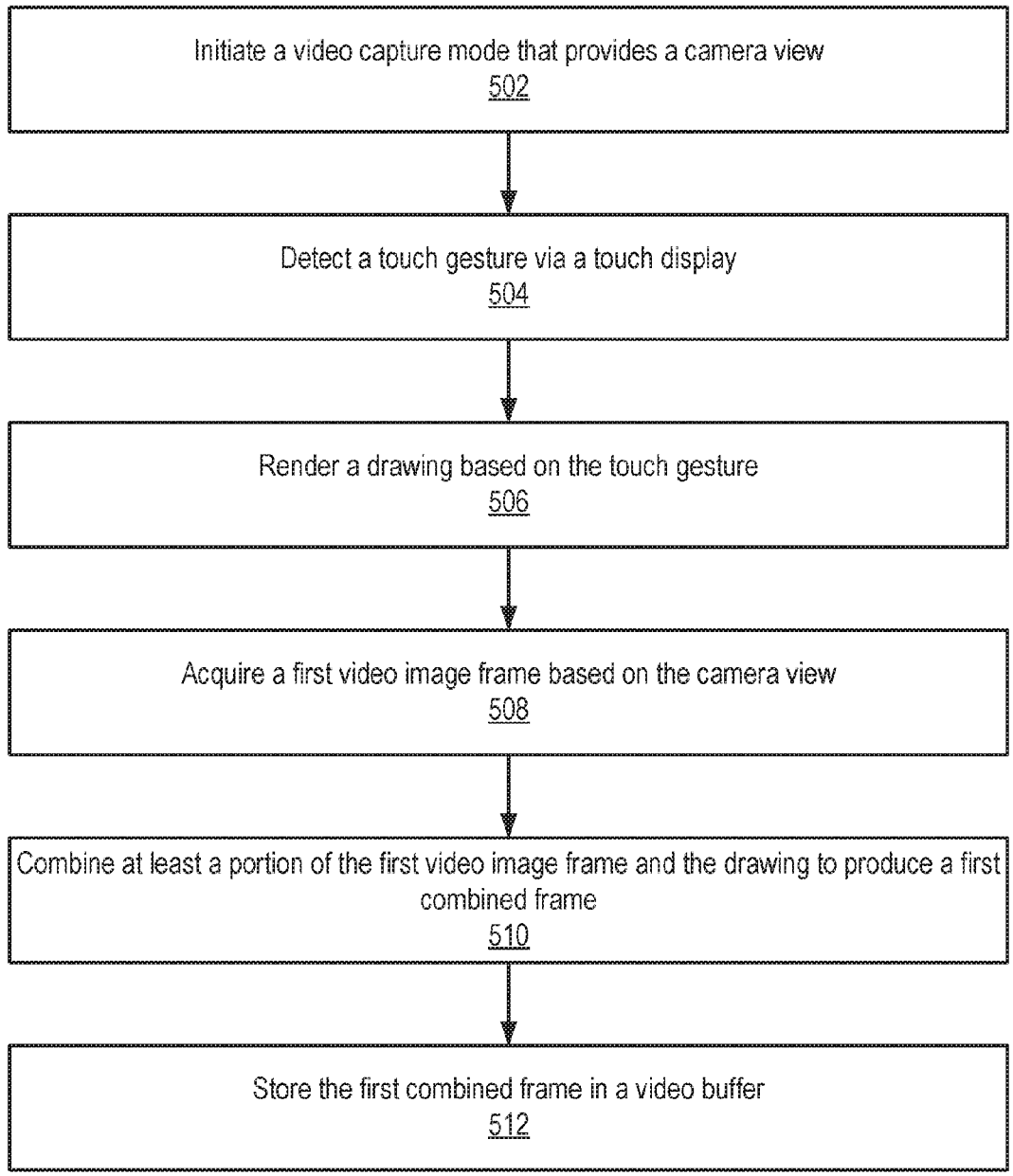
FIG. 5 illustrates an example method associated with combining drawings and videos prior to buffer storage, according to an embodiment of the present disclosure.

FIG. 5 illustrates an example method 500 associated with combining drawings and videos prior to buffer storage, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can initiate a video capture mode that provides a camera view. At block 504, the example method 500 can detect a touch gesture via a touch display. At block 506, the example method 500 can render a drawing based on the touch gesture. The drawing can be rendered to appear to overlay the camera view. At block 508, the example method 500 can acquire a first video image frame based on the camera view. At block 510, the example method 500 can combine at least a portion of the first video image frame and the drawing to produce a first combined frame. The drawing can appear to overlay the first video image frame. At block 512, the example method 500 can store the first combined frame in a video buffer.

Figure 6A:
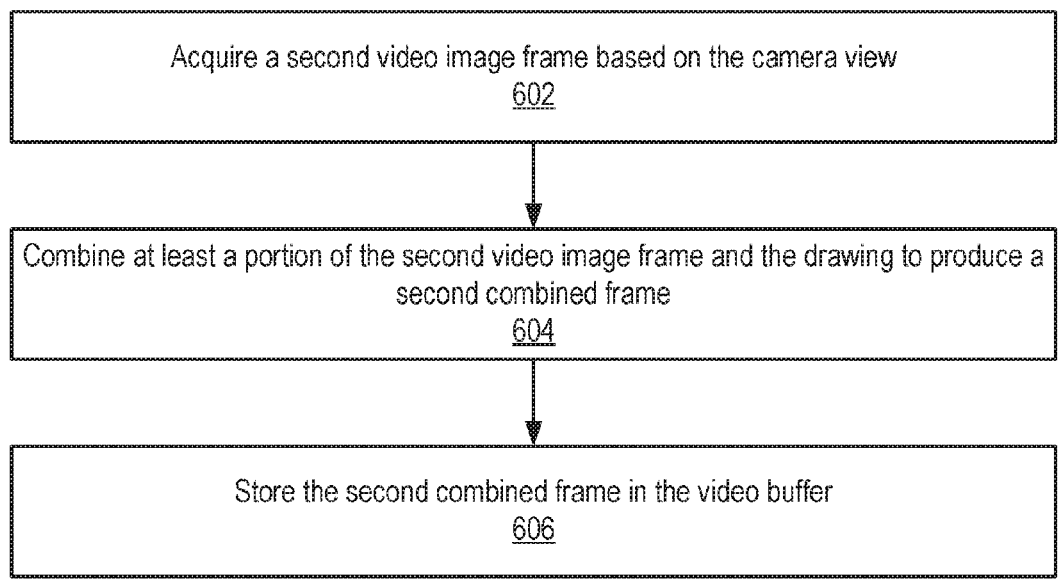
FIG. 6A illustrates an example method associated with combining drawings and videos prior to buffer storage, according to an embodiment of the present disclosure.

FIG. 6A illustrates an example method 600 associated with combining drawings and videos prior to buffer storage, according to an embodiment of the present disclosure. Again, it should be understood that there can be additional, fewer, or alternative steps performed in similar or alternative orders, or in parallel, within the scope of the various embodiments unless otherwise stated.

At block 602, the example method 600 can acquire a second video image frame based on the camera view. The second video image frame can be sequentially subsequent to the first video image frame. At block 604, the example method 600 can combine at least a portion of the second video image frame and the drawing to produce a second combined frame. The drawing can appear to overlay the second video image frame. At block 606, the example method 600 can store the second combined frame in the video buffer.

Figure 6B:
FIG. 6B illustrates an example method associated with combining drawings and videos prior to buffer storage, according to an embodiment of the present disclosure.

FIG. 6B illustrates an example method 650 associated with combining drawings and videos prior to buffer storage, according to an embodiment of the present disclosure. As discussed, it should be understood that there can be additional, fewer, or alternative steps performed in similar or alternative orders, or in parallel, within the scope of the various embodiments unless otherwise stated.

At block 652, the example method 650 can acquire, from the video buffer, the first combined frame and the second combined frame. At block 654, the example method 650 can generate a video content item based on at least the first combined frame and the second combined frame. The video content item (or a playback thereof) can present the second combined frame sequentially subsequent to presenting the first combined frame.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained. In another example, various embodiments of the present disclosure can learn, improve, and/or be refined over time.

Social Networking System—Example Implementation

Figure 7:
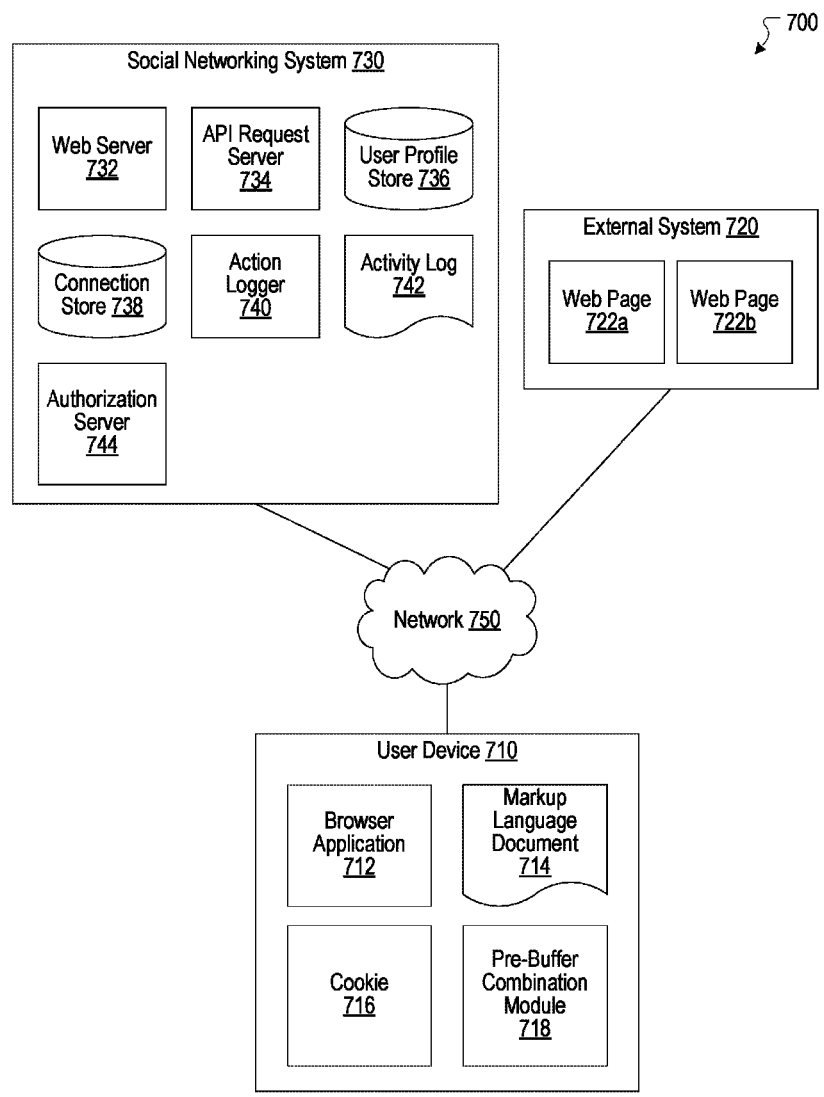
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a pre-buffer combination module 718. The pre-buffer combination module 718 can, for example, be implemented as the pre-buffer combination module 102 of FIG. 1. Other features of the pre-buffer combination module 718 are discussed herein in connection with the pre-buffer combination module 102.

Hardware Implementation

Figure 8:
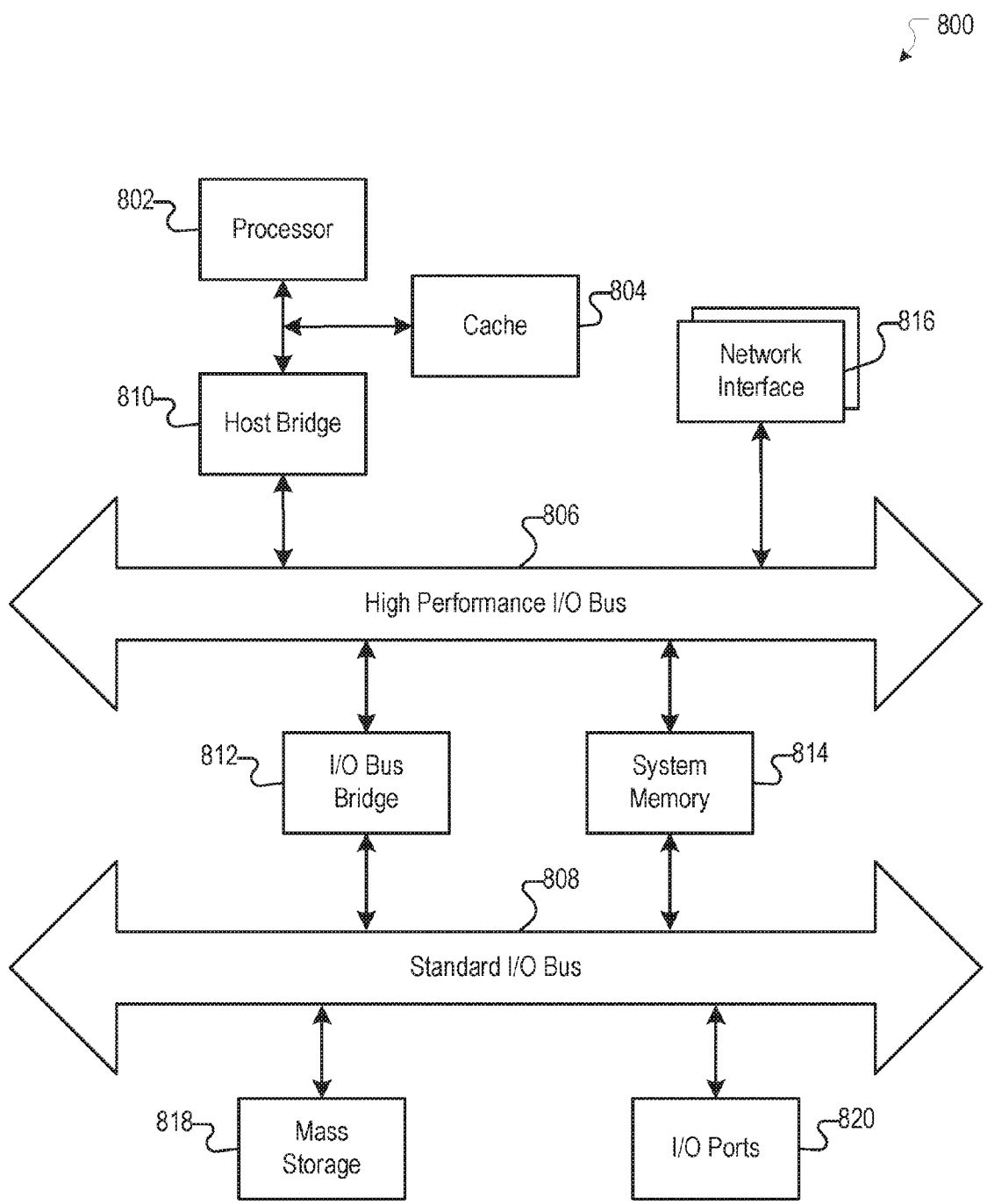
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a computing system, a touch gesture on a touch display within a camera view;
   rendering, by the computing system, a drawing based on the touch gesture detected on the touch display within the camera view at one or more positions on the touch display indicated by the touch gesture, the drawing being rendered to appear to overlay the camera view;
   capturing, by the computing system, a first video image frame as displayed in the camera view; and
   combining, by the computing system, prior to storage in a video buffer, at least a portion of the first video image frame that was captured and the drawing rendered based on the touch gesture at the one or more positions on the touch display indicated by the touch gesture to produce a first combined frame, wherein the drawing rendered based on the touch gesture at the one or more positions on the touch display indicated by the touch gesture appears to overlay the first video image frame that was captured.

2. The computer-implemented method of claim 1, further comprising:
   capturing a second video image frame as displayed in the camera view, the second video image frame being sequentially subsequent to the first video image frame; and
   combining, prior to storage in the video buffer, at least a portion of the second video image frame that was captured and the drawing rendered based on the touch gesture at the one or more positions on the touch display indicated by the touch gesture to produce a second combined frame, wherein the drawing rendered based on the touch gesture at the one or more positions on the touch display indicated by the touch gesture appears to overlay the second video image frame that was captured.

3. The computer-implemented method of claim 2, further comprising:
   storing the first combined frame in the video buffer; and
   storing the second combined frame in the video buffer.

4. The computer-implemented method of claim 3, further comprising:
   acquiring, from the video buffer, the first combined frame and the second combined frame; and
   generating a video content item based on at least the first combined frame and the second combined frame, wherein the video content item presents the second combined frame sequentially subsequent to presenting the first combined frame.

5. The computer-implemented method of claim 3, wherein the touch gesture includes a first touch gesture portion and a second touch gesture portion, wherein the first touch gesture portion is detected within an allowable time deviation from the capturing of the first video image frame, and wherein the second touch gesture portion is detected within an allowable time deviation from the capturing of the second video image frame.

6. The computer-implemented method of claim 5, wherein the first touch gesture portion and the second touch gesture portion continuously form at least part of the touch gesture.

7. The computer-implemented method of claim 1, wherein the combining of at least the portion of the first video image frame that was captured and the drawing rendered based on the touch gesture at the one or more positions on the touch display indicated by the touch gesture to produce the first combined frame further comprises:
   replacing a first set of pixels of the first video image frame at one or more positions of the first video image frame corresponding to the one or more positions on the touch display indicated by the touch gesture with a collection of pixels representing the drawing rendered based on the touch gesture; and
   compositing a second set of pixels of the first video image frame outside the one or more positions of the first video image frame with the collection of pixels representing the drawing rendered based on the touch gesture to produce the first combined frame.

8. The computer-implemented method of claim 1, further comprising:
   receiving one or more selections for one or more drawing options prior to the detecting of the touch gesture on the touch display, wherein the drawing is based on the one or more selections.

9. The computer-implemented method of claim 8, wherein the one or more drawing options include at least one of a drawing color, a drawing tool type, or a drawing tool size.

10. The computer-implemented method of claim 1, wherein the camera view corresponds to a live camera view presented in real-time.

11. A system comprising:
    at least one processor; and
    a memory storing instructions that, when executed by the at least one processor, cause the system to perform:
    detecting a touch gesture on a touch display within a camera view;
    rendering a drawing based on the touch gesture detected on the touch display within the camera view at one or more positions on the touch display indicated by the touch gesture, the drawing being rendered to appear to overlay the camera view;
    capturing a first video image frame as displayed in the camera view; and
    combining, prior to storage in a video buffer, at least a portion of the first video image frame that was captured and the drawing rendered based on the touch gesture at the one or more positions on the touch display indicated by the touch gesture to produce a first combined frame, wherein the drawing rendered based on the touch gesture at the one or more positions on the touch display indicated by the touch gesture appears to overlay the first video image frame that was captured.

12. The system of claim 11, wherein the instructions cause the system to further perform:

capturing a second video image frame as displayed in the camera view, the second video image frame being sequentially subsequent to the first video image frame; and combining, prior to storage in the video buffer, at least a portion of the second video image frame that was captured and the drawing rendered based on the touch gesture at the one or more positions on the touch display indicated by the touch gesture to produce a second combined frame, wherein the drawing rendered based on the touch gesture at the one or more positions on the touch display indicated by the touch gesture appears to overlay the second video image frame that was captured.

13. The system of claim 12, wherein the instructions cause the system to further perform:

storing the first combined frame in the video buffer; and
storing the second combined frame in the video buffer.

14. The system of claim 13, wherein the instructions cause the system to further perform:

acquiring, from the video buffer, the first combined frame and the second combined frame; and generating a video content item based on at least the first combined frame and the second combined frame, wherein the video content item presents the second combined frame sequentially subsequent to presenting the first combined frame.

15. The system of claim 11, wherein the combining of at least the portion of the first video image frame that was captured and the drawing rendered based on the touch gesture at the one or more positions on the touch display indicated by the touch gesture to produce the first combined frame further comprises:

replacing a first set of pixels of the first video image frame at one or more positions of the first video image frame corresponding to the one or more positions on the touch display indicated by the touch gesture with a collection of pixels representing the drawing rendered based on the touch gesture; and compositing a second set of pixels of the first video image frame outside the one or more positions of the first video image frame with the collection of pixels representing the drawing rendered based on the touch gesture to produce the first combined frame.

16. A non-transitory computer-readable storage medium including instructions that, when executed by at least one processor of a computing system, cause the computing system to perform:

detecting a touch gesture on a touch display within a camera view;

rendering a drawing based on the touch gesture detected on the touch display within the camera view at one or more positions on the touch display indicated by the touch gesture, the drawing being rendered to appear to overlay the camera view;

capturing a first video image frame as displayed in the camera view; and combining, prior to storage in a video buffer, at least a portion of the first video image frame that was captured and the drawing rendered based on the touch gesture at the one or more positions on the touch display indicated by the touch gesture to produce a first combined frame, wherein the drawing rendered based on the touch gesture at the one or more positions on the touch display indicated by the touch gesture appears to overlay the first video image frame that was captured.

17. The non-transitory computer-readable storage medium of claim 16, wherein the instructions cause the system to further perform:

capturing a second video image frame as displayed in the camera view, the second video image frame being sequentially subsequent to the first video image frame; and combining, prior to storage in the video buffer, at least a portion of the second video image frame that was captured and the drawing rendered based on the touch gesture at the one or more positions on the touch display indicated by the touch gesture to produce a second combined frame, wherein the drawing rendered based on the touch gesture at the one or more positions on the touch display indicated by the touch gesture appears to overlay the second video image frame that was captured.

18. The non-transitory computer-readable storage medium of claim 17, wherein the instructions cause the system to further perform:

storing the first combined frame in the video buffer; and
storing the second combined frame in the video buffer.

19. The non-transitory computer-readable storage medium of claim 18, wherein the instructions cause the system to further perform:

acquiring, from the video buffer, the first combined frame and the second combined frame; and generating a video content item based on at least the first combined frame and the second combined frame, wherein the video content item presents the second combined frame sequentially subsequent to presenting the first combined frame.

20. The non-transitory computer-readable storage medium of claim 16, wherein the combining of at least the portion of the first video image frame that was captured and the drawing rendered based on the touch gesture at the one or more positions on the touch display indicated by the touch gesture to produce the first combined frame further comprises:

replacing a first set of pixels of the first video image frame at one or more positions of the first video image frame corresponding to the one or more positions on the touch display indicated by the touch gesture with a collection of pixels representing the drawing rendered based on the touch gesture; and compositing a second set of pixels of the first video image frame outside the one or more positions of the first video image frame with the collection of pixels representing the drawing rendered based on the touch gesture to produce the first combined frame.

* * * * *